M. J. MALONEY.
LUBRICATING APPARATUS.
APPLICATION FILED NOV. 25, 1907.
911,418.
Patented Feb. 2, 1909.
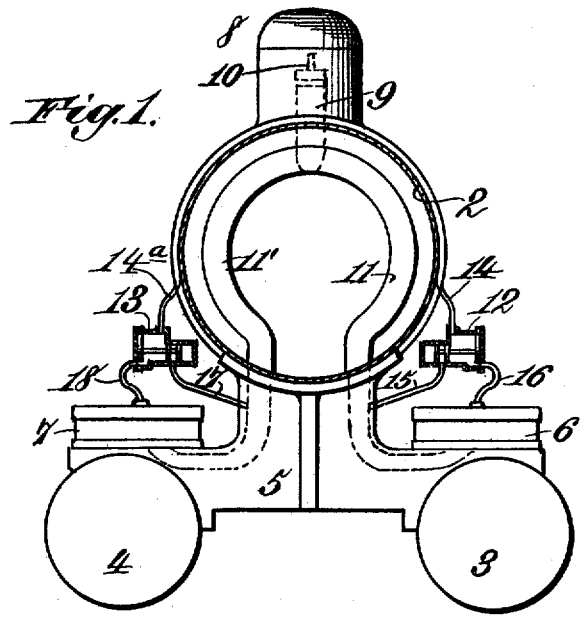
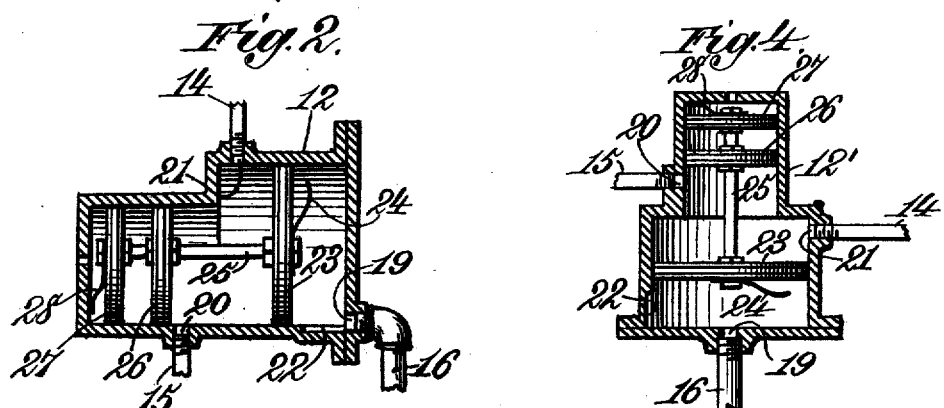
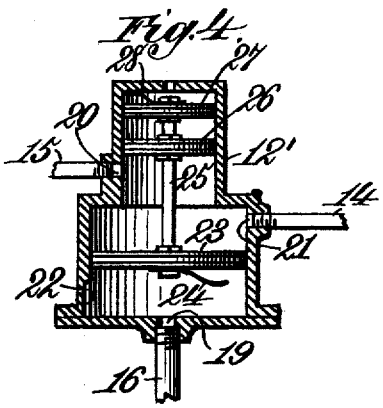
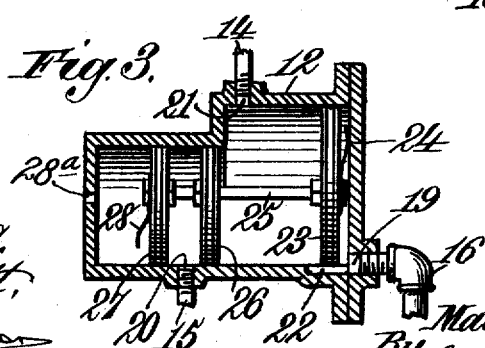
Witnesses.
Inventor:
Matthew John Maloney,
By James L. Norris
Atty.

UNITED STATES PATENT OFFICE.

MATTHEW JOHN MALONEY, OF MISSOULA, MONTANA.

LUBRICATING APPARATUS.

No. 911,418. Specification of Letters Patent. Patented Feb. 2, 1909.

Application filed November 25, 1907. Serial No. 403,708.

*To all whom it may concern:*

Be it known that I, MATTHEW J. MALONEY, a citizen of the United States, residing at Missoula, in the county of Missoula and State of Montana, have invented new and useful Improvements in Lubricating Apparatus, of which the following is a specification.

This invention relates to lubricating apparatus.

Lubricating apparatus involving my invention can be put to advantageous use in many different connections, although it is of especial utility when employed in connection with a locomotive whether the same be operated by steam or other fluid motive agent.

By virtue of my lubricating apparatus I can automatically change the feed of the oil or other lubricant from the live steam main direct to the slide valve mechanism or steam chests and vice versa.

In the drawings accompanying and forming a part of this specification I show in detail certain simple forms of embodiment of the invention which, to enable those skilled in the art to practice the same, will be fully set forth in the following description, while the novelty of the invention will be included in the claims succeeding said description.

In the embodiment of the invention represented in the drawings the apparatus has a plurality of lubricant supply ducts and fluid pressure controlled means for governing the passage of the lubricant through said ducts. Preferably there is what might be considered a primary duct and a secondary duct and with the same is coöperative fluid operated means for normally preventing the passage of the lubricant through the secondary duct. When the action of the fluid, whether it be steam, compressed air, or gas, is withdrawn from said means, the latter becomes operable to permit the lubricant to flow through the secondary duct. I wish to make it clear that I use the designations "primary" and "secondary" simply for convenience and not with the view of defining one as being subordinate or auxiliary to the other. By "normally" I refer to the running condition of the locomotive. Under normal conditions, therefore, when the locomotive is being propelled by its own steam or other fluid, such fluid is active for maintaining the means in question in such a relation as to permit the passage of the lubricant through the primary duct and from the latter indirectly to the slide valve. When this steam or other fluid is cut off, the said means automatically acts to permit the lubricant to flow directly, by way of the secondary duct, to the interior of the steam chest for lubricating the valve therein.

Referring to said drawings: Figure 1 is a sectional front elevation of a portion of a locomotive involving a lubricating apparatus constructed in accordance with my invention. Fig. 2 is a sectional view of one of the lubricant reversing devices shown in Fig. 1 and illustrating the parts therein in the positions they assume when the locomotive is being run by its own steam. Fig. 3 is a similar view, the parts being in the positions they occupy when the locomotive is drifting or at rest. Fig. 4 is a view corresponding to Figs. 2 and 3 of a modified form of the reversing device, the parts being in positions corresponding with those shown in Fig. 2.

Like characters refer to like parts throughout the several figures of the drawings.

Referring particularly to Fig. 1, the numeral 2 designates the boiler of a locomotive, 3 and 4 the steam cylinders thereof, 5 the steam saddle, 6 and 7 the steam chests, 8 the dome, 9 the dry or steam pipe leading from said dome, and 10 the throttle valve for controlling the flow of steam through said dry or steam pipe 9. These parts are of familiar construction and form in themselves no part of the invention. The dry steam pipe or main 9 has branches 11 and 11' for conveying steam into the saddle 5, such steam passing from the saddle into the steam chests 6 and 7 and from the latter into the cylinders 3 and 4 for propelling the pistons (not shown) therein, said steam chests 6 and 7 being equipped in practice with some suitable form of slide valve. I have shown as mounted over the steam chests 6 and 7 respectively casings as 12 and 13, the casings and the parts they inclose constituting lubricant feed-reversing devices and they may receive their supply of oil or other lubricant from any suitable source, for example, from the well known lubricator mounted in the cab of the locomotive and which is not shown. I have, however, shown the feed pipes leading from said lubricator, they being denoted by 14 and 14$^a$, respectively, the pipe 14 supplying the casing 12 and the pipe 14ᵃ supplying the casing 13. These pipes 14 and 14ᵃ are sometimes known as tallow pipes.

The casings 12 and 13 have pipes as 15, 16, 17, and 18, respectively, leading therefrom, the pipes 15 and 17 serving to convey lubricant to the branches 11 and 11' of the main or dry pipe 9 whereby such lubricant can be subsequently applied to the valves in the two chests 6 and 7, while the pipes 16 and 18 conduct the lubricant directly from the casings 12 and 13 into said steam chests for application to the valves therein. The pipes 15 and 16 are in effect branches of the pipe 14, while the pipes 17 and 18 are the same with respect to the pipe 14ᵃ, the casings 12 and 13 being located at the junctions of the respective two sets of pipes. When the locomotive is being operated under its own steam, the lubricant will be conveyed to the steam chests 6 and 7 by way of the pipes 15 and 17, while, when the engine is drifting or coasting or at rest, such lubricant will enter the steam chests directly by way of the pipes 16 and 18 as will hereinafter more particularly appear. In both cases the supply of oil to the valves in the steam chests 6 and 7 is secured by gravity feed. The two casings 12 and 13 are alike in construction, and the same statement applies to the parts inclosed therein, so that a detailed description of one of said casings, for example, that designated by 12, and the parts inclosed thereby, will apply to the other, and said casing 12 and its said inclosed parts are shown in detail in Figs. 2 and 3. The casing 12 is represented as made up of an outer cylindrical portion and an inner cylindrical portion disposed eccentrically with respect to each other and placed horizontally, the inner cylindrical portion being represented as of less diameter than the outer cylindrical portion. In the outer head of the casing 12 is a port 19 and this port or opening coincides with the bore or passage through the pipe 16 tapped or otherwise fitted into said outer head. The opposite end of the pipe 16 may be similarly connected with the top of the steam chest 6. In the bottom portion of the casing 12 is a port as 20 into which the pipe 15 is similarly fitted, while the lower end of the pipe 14 is likewise mounted in a port as 21 in the top of the casing 12. Within the casing 12 and at the bottom thereof I have shown a channel or groove as 22, the outer open end of which is in register with the port 19. This channel or groove 22 extends inwardly a short distance along the bottom portion of the casing 12 and, with the pipe 16, constitutes a secondary duct such as that to which reference has been hereinbefore made. The pipe 15 and the branch 11 of the dry pipe or main 9 constitutes a primary duct. It is, of course, conceivable that these two ducts might take a very different form. In the larger portion of the casing 12 I have shown reciprocative a piston as 23, said piston in the present case having a movement beyond the inner closed end of the channel or groove 22, as shown in Fig. 2, to a point near the outer head of said casing 12. Preferably said piston does not directly engage said outer head, said piston being provided with a buffing device such as the spring 24, to prevent such result. Said piston or diaphragm 23 constitutes really a valve for, when in its inner position as shown in Fig. 2, it prevents the passage of oil from the casing 12 into the pipe 16, although, when in its outer position as shown in Fig. 3, it permits oil to flow from the casing 12 into the pipe 16 by way of the channel or groove 22 and port 19.

The piston, diaphragm, or valve 23 is represented as fastened to the outer end of the stem or rod 25, said rod also carrying the pistons 26 and 27, the piston 27 being provided with a buffing spring 28 to engage the inner head of the casing 12 when the three pistons 23, 26, and 27 are at the extreme inner ends of their strokes, as shown in Fig. 2. The piston 26 constitutes a valve for controlling the flow of lubricant into the pipe 15 and is located between the pistons 23 and 27, the pistons 26 and 27 being separated sufficiently to be located at opposite sides of the port 20 when the three pistons occupy the position shown in Fig. 3, at which time the piston 26 prevents the flow of oil into the pipe 15, while the piston 27 shuts said pipe 15 off from the atmosphere by way of the vent opening 28ᵃ.

During what I have described as normal conditions, the parts will be in the positions they are represented as occupying in Fig. 2, there being steam in the two chests 6 and 7. This steam escapes from the two chests into the pipes 16 and 18 and acts against the pistons 23 so as to hold the same in their inner positions whereby the piston or valve 26 will be maintained in such position as to permit the passage of oil from the casings 12 into the two pipes 15 and 17 to be conducted indirectly to the two steam chests. When, however, the steam is cut off, there is nothing to prevent outward motion of the three pistons, and this outward movement is accomplished by the pressure of the lubricant flowing from the pipes 14 and 15 against the pistons 23 the effective areas of which are respectively greater than those of the pistons 26. When, therefore, the supply of steam is cut off, the two sets of pistons 23, 26, and 27 are moved outwardly from the position shown in Fig. 2 to the position shown in Fig. 3, the pistons 23 crossing the channels 22 during this time, and the pistons 26 crossing the ports 20, whereby oil can pass into the pipes 16 and 18 to directly lubricate the valves in the steam chests 6 and 7 and to cut off the supply of oil to the steam chests by way of the pipes 15 and 17. When the steam again flows it passes into the pipes 15 and 17 respectively and, leaving the latter, enters the casings 12 and 13 by way of the ports 20 passing at this time into the space between the respective pistons 26 and 27 thereby balancing said pistons 26 and 27, while steam from the pipes 16 and 18 respectively can act against the outer faces of the pistons 23 to cause the inward movement of the two sets of pistons. The inner heads of the casings 12 and 13 are shown as having vent openings designated in each case by 28ª and which permit free reciprocative action of the two sets of pistons. The casings 12 and 13 are shown as horizontally disposed. They might be vertically disposed as shown by the casing 12′ in Fig. 4. The casing 12′ is represented as consisting of two superimposed concentric cylindrical portions and is equipped with pipes 14, 15, and 16 equivalents of the pipes correspondingly numbered and hereinbefore described. The casing 12′ contains pistons 23, 26, and 27 carried by a common stem 25 also as hereinbefore described.

What I claim is:

1. A lubricator having a primary duct, a secondary duct, and fluid operated means for normally preventing the passage of the lubricant through the secondary duct, said fluid operated means, when the action of the fluid is withdrawn therefrom, being operable to permit the lubricant to flow through the secondary duct.

2. A lubricating apparatus having a casing provided with outlets for the lubricant, valve means in the casing for controlling said outlets, and means for directing a pressure fluid into said casing to hold the valve means in position to permit the passage of the lubricant from one of said outlets and to prevent such lubricant passing through the other outlet, the latter outlet being free to permit the lubricant to flow directly therethrough when the force of the pressure fluid is withdrawn from the casing.

3. The combination of a steam chest, a casing, a pipe for conveying lubricant from the casing to the steam chest, a steam pipe, a pipe connecting the casing and the steam pipe, a lubricant feed pipe connected to the casing, and valve means in the casing operated by steam pressure for controlling the passage of the lubricant through the said conveying pipe between the casing and steam chest and the feed pipe.

4. A lubricator having a primary duct, a secondary duct, controlling means movable into two different positions, in one of which it is adapted to permit the passage of the lubricant through the primary duct and prevent the passage of said lubricant through the secondary duct, and in the other of which it is adapted to permit the passage of the lubricant through the secondary duct and prevent its passage through the primary duct, means for directing a pressure fluid against said controlling means to positively move it into one of its two positions, and a supply pipe connected to the lubricator, the withdrawal of the pressure fluid means from the said controlling means causing the latter to automatically act to permit the lubricant to directly flow from the supply pipe to the secondary duct.

5. A lubricator having a casing, a primary duct leading from said casing, means for delivering a pressure fluid into said primary duct, the casing having a secondary duct associated therewith, means for passing pressure fluid through the secondary duct, and valve means movable in the casing and operable by the action of such pressure fluid to permit the passage of lubricant through the primary duct and movable automatically to a position to cut off the passage of the lubricant through the primary duct and permit its entrance into the secondary duct when the action of such pressure fluid is removed.

6. A lubricating apparatus having a plurality of lubricant supply ducts, controlling means for governing the passage of lubricant through said ducts in alternation and movable into one of two positions automatically, and means for causing the action of a pressure fluid against the said controlling means to operate it in opposition to its automatic action.

7. A lubricating apparatus having a plurality of lubricant supply ducts and a supply pipe, controlling means for governing the passage of the lubricant through said ducts and automatically movable into two different positions, the controlling means when in one position permitting a portion of the supply ducts and the supply pipe to be in direct communication, and means for cutting off the passage of the lubricant from the supply pipe to the remaining duct when the said pipe and the other duct are in communication.

8. A lubricating apparatus having a casing, pipes leading from said casing to conduct the lubricant therefrom, means for introducing a pressure fluid into said casing, and a plurality of connected pistons in said casing, constituting valves and operable by the pressure fluid to stop the flow of lubricant through one of said pipes and to permit its entrance into the other of said pipes when acted on by said pressure fluid, said pistons, when the action of the pressure fluid is removed therefrom, being automatically movable to a position to change the course of lubricant through said pipes.

9. In a lubricating apparatus, a casing, pipes for the conduct of lubricant from said casing, three pistons in the casing, two of which constitute valves, a stem common to the several pistons, means for directing a pressure fluid against the pistons to cause them to move into a position to permit the passage of lubricant through one of said pipes and to prevent the passage of such lubricant through the other of said pipes, the pistons being automatically movable into a position to reverse the flow of the lubricant when the pressure acting thereagainst is withdrawn, said casing having a vent opening to permit the operation of the pistons under the action of said pressure fluid.

10. In a lubricating apparatus, a casing, a pipe for lubricant leading from said casing, a second pipe also leading from the casing, three pistons in the casing, and a stem common to and connecting the pistons, the outer pistons having springs to act against the opposite ends of the casing, and the casing having an interior channel adapted to be crossed by one of the pistons when the latter is at one end of its stroke.

11. An apparatus of the class described having a lubricant feed pipe, branch pipes receiving lubricant from said feed pipe, and controlling means operative by fluid pressure for governing the passage of lubricant in alternation from the feed pipe to the branch pipes, the said controlling means when in one position permitting direct communication between the feed pipe and one of the branch pipes.

In testimony whereof I have hereunto set my hand in presence of two subscribing witnesses.

MATTHEW JOHN MALONEY.

Witnesses:
 ORVAL F. ADAMS,
 THOS. A. MONSON.